US011334402B2

(12) United States Patent
Kumar et al.

(10) Patent No.: US 11,334,402 B2
(45) Date of Patent: May 17, 2022

(54) SDIO CHIP-TO-CHIP INTERCONNECT PROTOCOL EXTENSION FOR SLOW DEVICES AND POWER SAVINGS

(71) Applicant: QUALCOMM Incorporated, San Diego, CA (US)

(72) Inventors: Rudhresh Kumar, Chennai (IN); Mamta Desai, San Diego, CA (US); Dhamim Packer Ali, San Diego, CA (US); Thirupathi Venkatarajan, Chennai (IN); Santan Kumar, Bokaro (IN)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/938,845

(22) Filed: Jul. 24, 2020

(65) Prior Publication Data
US 2021/0073053 A1    Mar. 11, 2021

(30) Foreign Application Priority Data

Sep. 10, 2019  (IN) .............................. 201941036366

(51) Int. Cl.
G06F 9/54     (2006.01)
G06F 9/30     (2018.01)
G06F 13/40    (2006.01)
G06F 9/46     (2006.01)

(52) U.S. Cl.
CPC .......... *G06F 9/542* (2013.01); *G06F 9/30098* (2013.01); *G06F 9/466* (2013.01); *G06F 9/544* (2013.01); *G06F 13/4063* (2013.01)

(58) Field of Classification Search
CPC ............................. G06F 9/4812; G06F 9/542
USPC ......................................................... 719/318
See application file for complete search history.

(56) References Cited

U.S. PATENT DOCUMENTS

| 9,104,539 | B2 * | 8/2015 | Fujimoto | G06F 9/30134 |
| 9,442,794 | B1 * | 9/2016 | Tian | G06F 11/0778 |
| 9,557,802 | B2 * | 1/2017 | Wu | G06F 1/266 |
| 10,127,172 | B2 * | 11/2018 | Szeto | G06F 13/28 |
| 2006/0218324 | A1 * | 9/2006 | Zayas | G06F 13/385 |
| | | | | 710/65 |
| 2009/0172202 | A1 | 7/2009 | Goh et al. | |
| 2012/0260008 | A1 | 10/2012 | Kumar et al. | |

FOREIGN PATENT DOCUMENTS

WO     2008068612 A1    6/2008

OTHER PUBLICATIONS

International Search Report and Written Opinion—PCT/US2020/043695—ISA/EPO—dated Oct. 19, 2020.

* cited by examiner

*Primary Examiner* — Andy Ho
(74) *Attorney, Agent, or Firm* — Qualcomm Incorporated

(57) ABSTRACT

A method of improving synchronization over a secure digital (SD) bus between an SD host and an SD client device is described. The method includes writing to a client event register to interrupt the SD host for an SD extended command. The method also includes triggering the SD host to issue the SD extended command to the SD client device over the SD bus in response to the SD client device writing to the client event register.

20 Claims, 13 Drawing Sheets

Event Register Breakdown

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved (8) ||||||||  Byte count in Block + Byte mode (9) |||||||||  Block / Byte count (9) |||||||||  Mode (2) || Event (4) ||||

700

- Event [0:3] = The 4bit Event ID can have a pre determined meaning as examples shown below
  1. TX_EVENT(val = 1), Indicates Host about to send CMD53 for write operation
  2. TX_ACK_EVENT(val = 2), Indicates acknowledgement for Host TX request
  3. RX_EVENT(val = 3), Indicates Target requesting a CMD53 read operation

- Mode [4:5] = The 2bit mode indicates the CMD53 mode as shown below
  1. 00 = Invalid Mode
  2. 01 = Byte Mode
  3. 10 = Block Mode
  4. 11 = Block + Byte Mode

- Count [6:14] = The 9bit count indicates either block or byte count based on the Mode, in case of "Block + Byte mode" these bits indicate only block count

- Byte count [15:23] = This 9bit indicates the byte count but only valid in "Block + Byte mode"

- Reserved [24:31] = This 9bit is reserved for future expansion

*FIG. 7*

SDIO CHIP-TO-CHIP INTERCONNECT PROTOCOL EXTENSION FOR SLOW DEVICES AND POWER SAVINGS

CROSS-REFERENCE TO RELATED APPLICATION

The present application claims the benefit of Indian Provisional Patent Application No. 201941036366, filed on Sep. 10, 2019, and titled "SDIO CHIP-TO-CHIP INTERCONNECT PROTOCOL EXTENSION FOR SLOW DEVICES AND POWER SAVINGS," the disclosure of which is expressly incorporated by reference herein in its entirety.

FIELD

The present disclosure generally relates to apparatuses incorporating integrated circuits (ICs). More specifically, aspects of the present disclosure relate to a secure digital (SD) input/output (SDIO) chip-to-chip interconnect protocol extension for slow devices and power savings.

BACKGROUND

Various types of communications links and communications protocols are used for interconnecting devices and allowing interconnected devices to communicate with one another. Communications links use different methods for controlling the flow of commands and data between interconnected devices. For example, one device may operate as a master of a communications link, while other devices operate as slaves on the communications link. In this master/slave configuration, the master device issues commands on the communications link that permit the slave devices to communicate. If a particular slave device does not receive an appropriate command, then the device does not transmit on the communications link. A single master device, therefore, controls the flow of commands and data on the communications link.

A particular system for communicating with client devices is provided by a secure digital (SD) input/output (SDIO) protocol. An SDIO system is useful for two-way communications with the client devices in a computer system. The SDIO protocol relies on an SDIO host to communicate with client devices within a personal computer (PC) or other mobile computing device. The SDIO host operates as an SDIO master and controls other SDIO slave devices connected to the SDIO host. Data flow is controlled and monitored by the SDIO host.

The SDIO protocol is entirely host/master driven. Slave devices operating according to the SDIO protocol cannot initiate data transfers. A system for permitting communication between an SD client device and an SD host to trigger the SD host to issue an SD direct command to the SD client device is desired.

SUMMARY

A method of improving synchronization over a secure digital (SD) bus between an SD host and an SD client device is described. The method includes writing to a client event register to interrupt the SD host for an SD extended command. The method also includes triggering the SD host to issue the SD extended command to the SD client device over the SD bus in response to the SD client device writing to the client event register.

A method of improving synchronization over a secure digital (SD) bus between an SD host and an SD client device is described. The method includes writing to a host event register of a host function address space to notify the SD client device of an SD extended command using an SD direct command. The method also includes issuing the SD extended command to the SD client device in response to an interrupt from the SD client device through a client event register of the host function address space.

An apparatus configured to improve synchronization over a secure digital (SD) bus is described. The apparatus includes a client event register. The apparatus also includes a processor coupled to the client event register. The processor is configured to write to the client event register to interrupt an SD host for an SD extended command. The processor is also configured to trigger the SD host to issue the SD extended command to the apparatus over the SD bus by writing to the client event register.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 7 is a diagram illustrating a sample event register format, according to aspects of the present disclosure.

DETAILED DESCRIPTION

Figure 1:
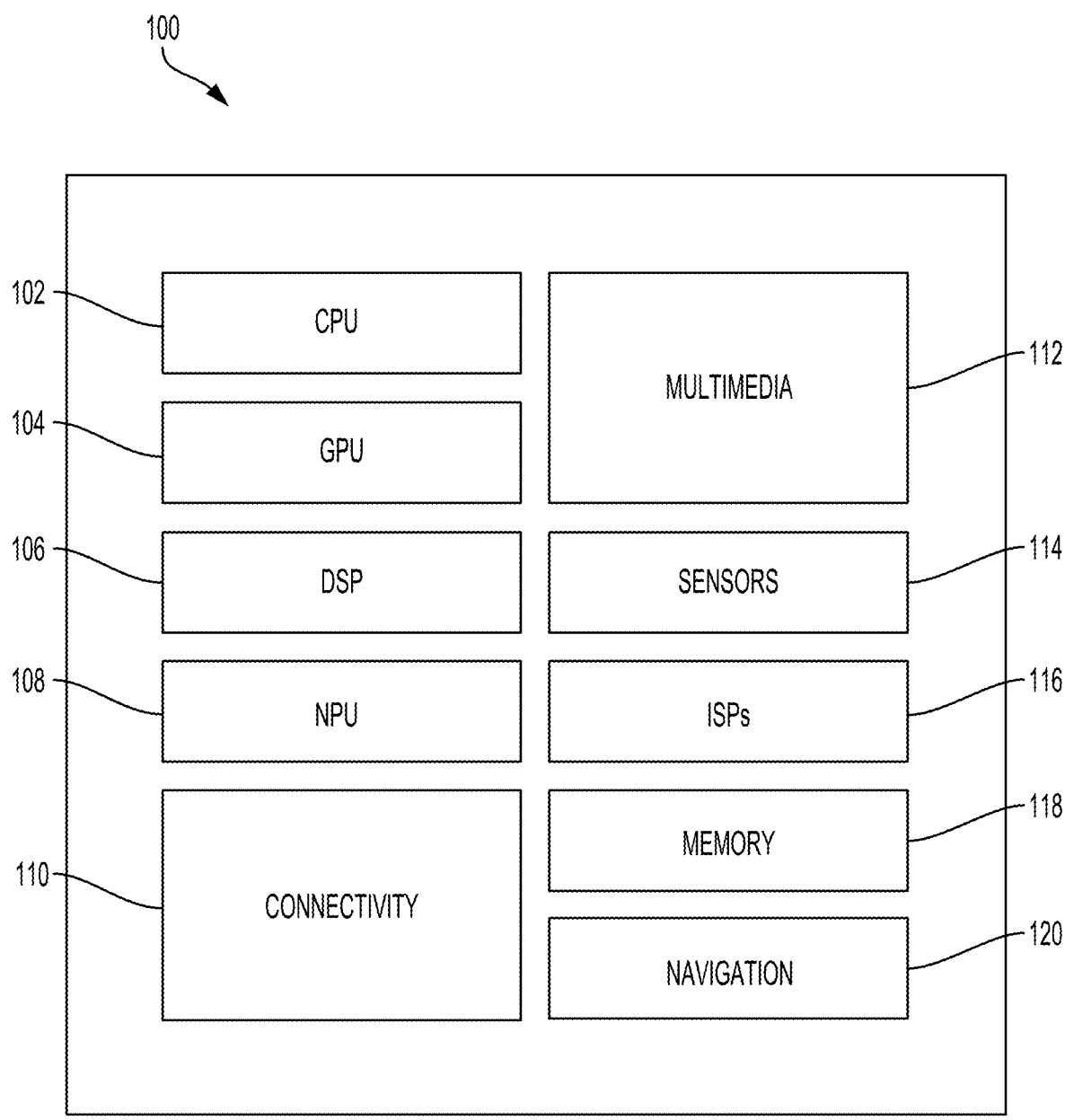
FIG. 1 is a block diagram illustrating an example implementation of a system-on-a-chip (SOC), including a connectivity module, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

As described, the use of the term "and/or" is intended to represent an "inclusive OR", and the use of the term "or" is intended to represent an "exclusive OR". The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Various types of communications links and communications protocols are used for interconnecting devices and allowing interconnected devices to communicate with one another. A particular system for communicating with client devices is provided by a secure digital (SD) input/output (SDIO) protocol. An SDIO system is useful for host initiated two-way communications with the client devices in a computer system. The SDIO protocol relies on an SDIO host to communicate with client devices within a personal computer (PC) or other mobile computing device. The SDIO host operates as an SDIO master and controls other SDIO slave devices connected to the SDIO host. Data flow is controlled and monitored by the SDIO host.

The SDIO protocol is entirely host/master driven. Slave devices operating according to the SDIO protocol cannot initiate data transfers on an SD bus communicably coupling the slave devices and the host/master. This inability to initiate data communications from the slave devices may violate latency specifications of the SDIO protocol, resulting in timeout errors of SDIO transactions. It is, therefore, desirable to provide a system for permitting communication between an SD client device and an SD host to trigger the SD host to issue an SD direct command to the SD target device.

Aspects of the disclosure relate to an SDIO chip-to-chip interconnect protocol extension for supporting slow target devices, while providing improved power savings. In one aspect of the present disclosure, a system permits communication between an SD client device and an SD host for triggering the issuing of an SD direct command from the SD host to the SD client device. Triggering of an SD direct command is enabled by a client event register (CER) within the register space of the target device and the address space of the SD host. Aspects of the present disclosure utilize a host event register (HER), which belongs to an F1 function address space, as specified by the SDIO protocol. The host event register and client event register may prevent timeout of low speed embedded (e.g., Internet-of-things (IOT)) devices when operating in a low power mode (LPM) in response to an SD direct command from an SD host. Preventing timeout of low speed embedded devices may improve boot-loader hardware to expedite device boot-up.

FIG. 1 is a block diagram illustrating an example implementation of a host system-on-a-chip (SOC) 100, which includes a connectivity block 110 configured to trigger secure digital (SD) direct commands over an SD bus, in accordance with aspects of the present disclosure. The host SOC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, USB connectivity, Bluetooth connectivity, Secure Digital (SD) connectivity, and the like.

In this configuration, the host SOC 100 includes various processing units that support multi-threaded operation. For the configuration shown in FIG. 1, the host SOC 100 includes a multi-core central processing unit (CPU) 102, a graphics processor unit (GPU) 104, a digital signal processor (DSP) 106, and a neural processor unit (NPU) 108. The host SOC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advance RISC machine (ARM), a microprocessor, or some other type of processor. The NPU 108 may be based on an ARM instruction set.

Figure 2:
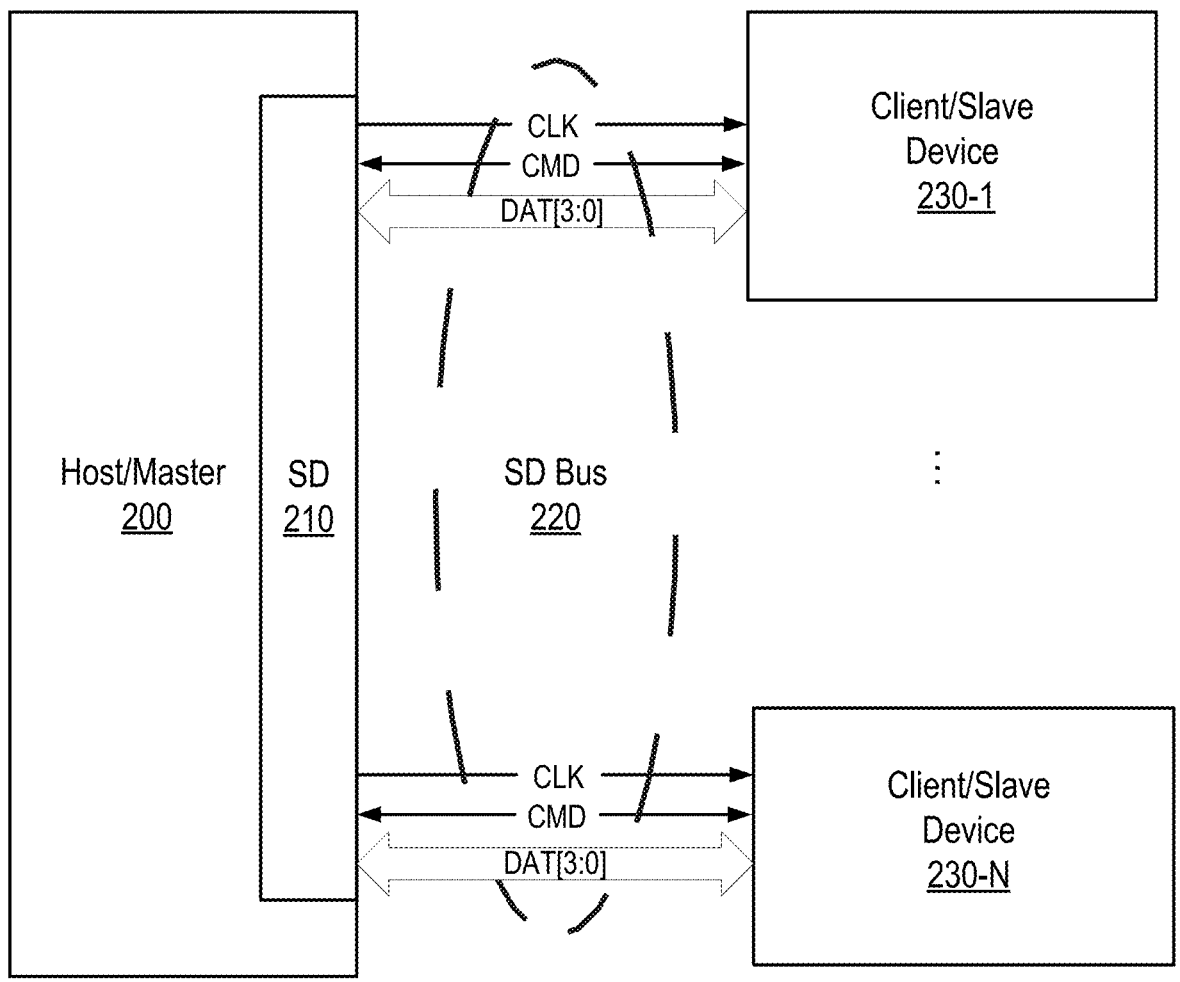
FIG. 2 is a block diagram illustrating an example implementation of signal pins for a secure digital (SD) host communicably coupled to SD slave devices in a host/slave SD input/output (SDIO) configuration, in accordance with aspects of the present disclosure.

FIG. 2 is a block diagram illustrating an example implementation of signal pins for a secure digital (SD) host communicably coupled to SD slave devices in a host/slave SD input/output (SDIO) configuration, in accordance with aspects of the present disclosure. In this configuration, a host/master 200 may be the host SOC 100, or a block of the host SOC 100, such as the connectivity block 110 or other like block of the host SOC 100, including a secure digital (SD) controller/interface 210. In this example, the host/master 200 includes the SD controller/interface 210, configured to communicate with client/slave devices 230 (230-1, . . . , 230-N) over an SD bus 220.

The SD bus 220 is configured according to the SDIO protocol and carries a clock (CLK) signal, an SD command (CMD) signal, and a data signal (DAT[3:0]). As noted above, the SDIO protocol is entirely driven by the host/master 200. As a result, the client/slave devices 230 cannot initiate any data transfers. In operation, the host/master 200 uses SD commands for controlling data transfers as well as communications to/from the client/slave devices 230. For example, the host/master 200 uses an SD direct command (e.g., command fifty-two (CMD52)) for performing byte reads and issuing abort commands. The host/master 200 uses an SD extended command (e.g., command fifty-three (CMD53)) for performing burst reads and writes from/to the client/slave devices 230. That is, an SD extended command may be a CMD53 read command or a CMD53 write command.

The host/master 200 is generally configured to perform burst data transfers using the CMD53 command for performing both read and write operations. In operation, a command header is communicated from the host/master 200 to one of the client/slave devices 230 prior to data transfer. The command header generally indicates a packet data size and is immediately followed by the packet data. A dataflow from the host/master 200 to the client/slave devices 230 may be referred to as a transmit direction. By contrast, a dataflow from the client/slave devices 230 to the host/master 200 may be referred to as a receive direction. In the transmit direction, a state of the client/slave devices 230 may introduce unwanted latency, resulting in a timeout error of a data transaction over the SD bus 220.

Figure 3:
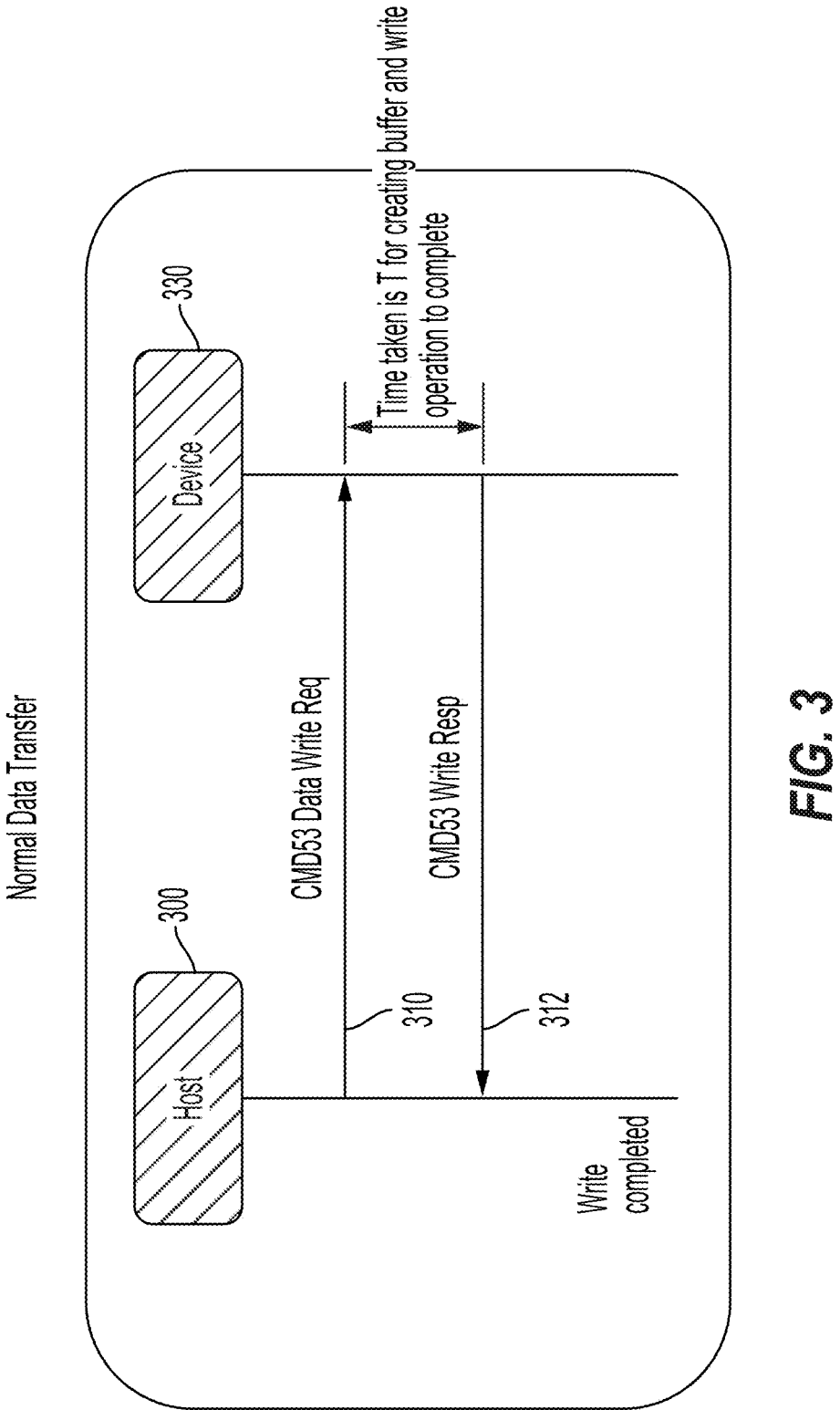
FIG. 3 is a timing diagram further illustrating the host/slave secure digital input/output (SDIO) configuration of FIG. 2 during a normal data transfer, in accordance with aspects of the present disclosure.

FIG. 3 is a timing diagram further illustrating the host/slave SDIO configuration of FIG. 2 during a normal data transfer, in accordance with aspects of the present disclosure. As noted, the SDIO protocol is based on a master/slave configuration specified by the SD Card Association. In this example, an SD host 300 controls reading/writing of data from an SD client device 330 by issuing CMD52/CMD53 SDIO direct commands to read/write from/to the SD client device 330. The SD client device 330, when active, responds to these SD direct commands.

As shown in FIG. 3, the SD host 300 issues a CMD53 data write request to the SD client device 330, at time 310. The SDIO protocol enables the SD host 300 to specify a time period (T) in which the SD client device 330 creates a client buffer to complete the CMD53 data write request. Because SDIO is a host driven protocol and the SD client device 330 is likely an I/O device (e.g., a mobile station modem (MSM)), a data processing speed depends on the actual I/O operation performed by the SD client device 330. The processing speed also depends on each I/O function performed by the SD client device 330 and the amount of data prepared may depend on the application and the capability of the SD client device 330. The SD client device 330 responds to the SD host 300 by issuing a data response to complete the write operation, at time 312.

Figure 4:
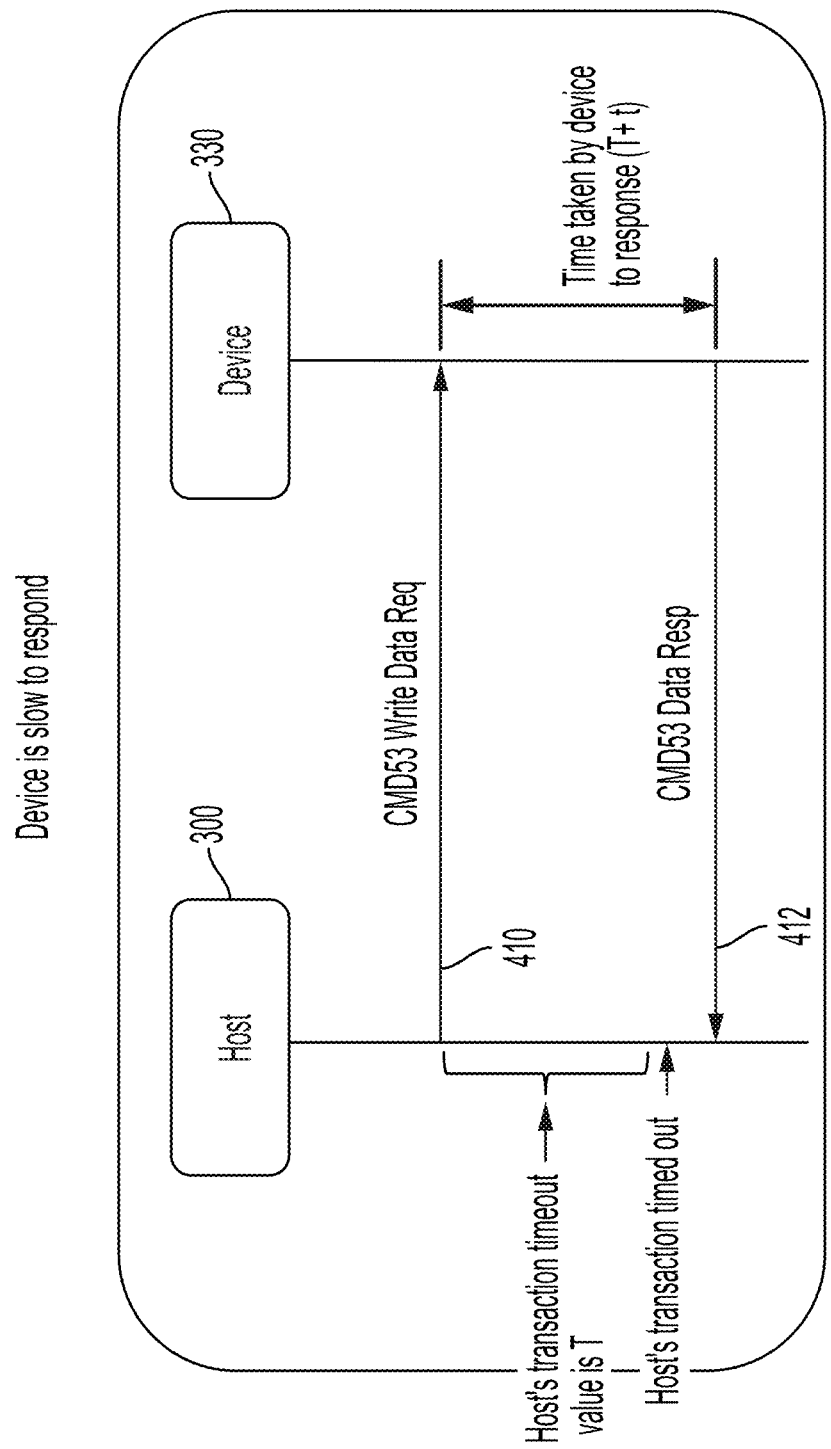
FIG. 4 is a timing diagram further illustrating the host/slave secure digital input/output (SDIO) configuration of FIG. 3 during timeout of a data transfer due to a low speed target device, in accordance with aspects of the present disclosure.

FIG. 4 is a timing diagram further illustrating the host/slave SDIO configuration of FIG. 3 during timeout of a data transfer due to a low speed target device, in accordance with aspects of the present disclosure. For example, the SD host 300 issues a CMD53 write data request to the SD client device 330, at time 410. In this example, however, the write transaction from the SD host 300 times out due to expiration of a transaction timeout T of the SD host 300. The timeout occurs because the SD client device 330 responds to the CMD53 write request after a time period (T+t) by issuing the CMD53 data response to the SD host 300, at time 412.

FIG. 4 illustrates a data preparation delay period (t) that causes a timeout of the write transaction from the SD host 300. This data preparation delay period (t) may be due to the configuration of the SD client device 330. For example, timeout of the host write transaction may occur when the SD client device 330 is configured as a low speed embedded (e.g., Internet-of-things (IOT)) device. In particular, the operating speed of the SD client device 330 leads to a data preparation timeout in response to the CMD53 write data request. The data preparation may involve allocation of buffer space of the SD client device 330 to accommodate incoming packet data from the SD host 300.

Figure 5:
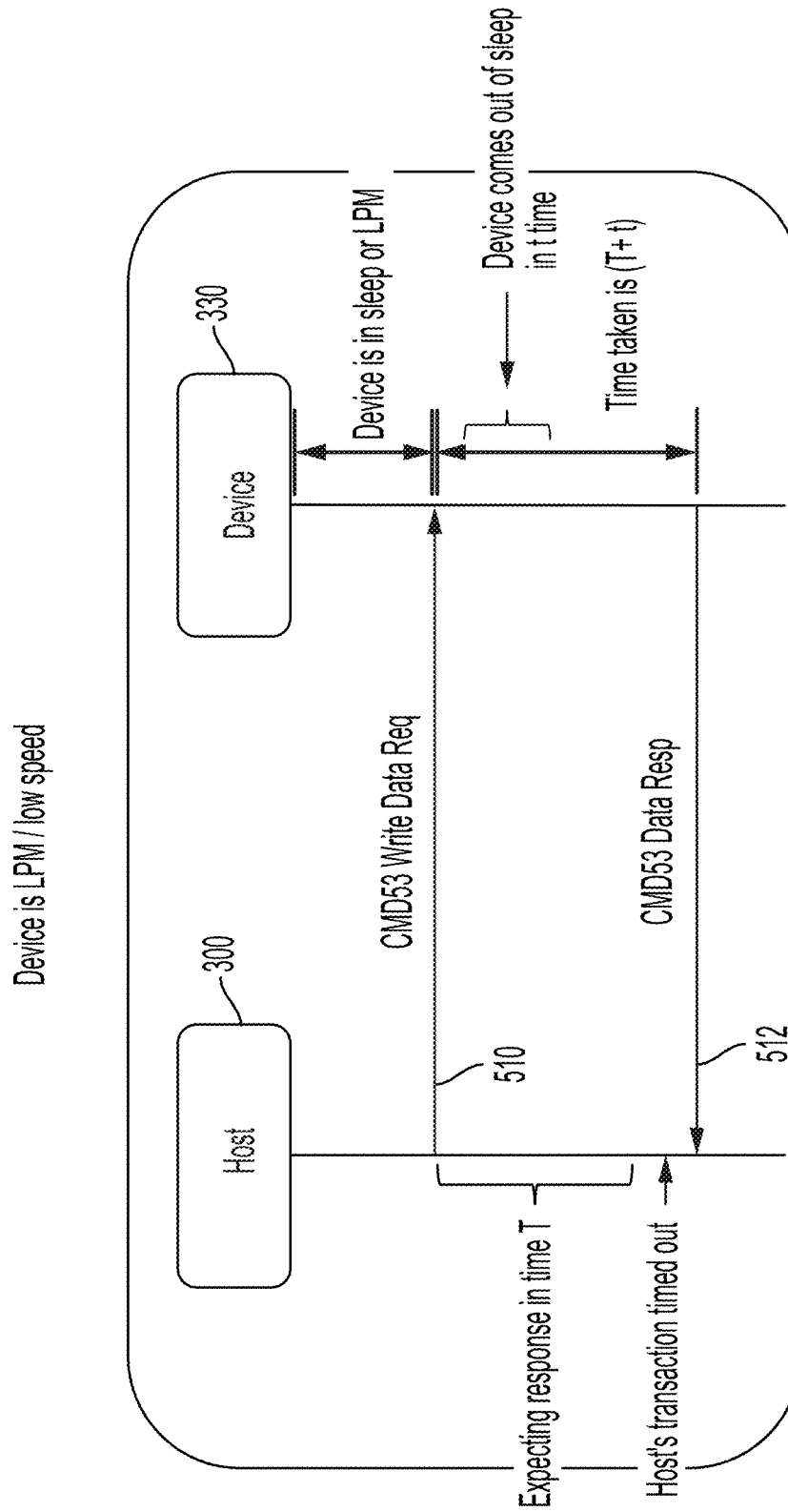
FIG. 5 is a timing diagram further illustrating the host/slave secure digital input/output (SDIO) configuration of FIG. 3 during timeout of a data transfer due to a low power mode (LPM)/sleep mode target device, in accordance with aspects of the present disclosure.

FIG. 5 is a timing diagram further illustrating the host/slave SDIO configuration of FIG. 3 during timeout of a data transfer due to a low power mode (LPM)/sleep mode target device, in accordance with aspects of the present disclosure. In this example, synchronization between the SD host 300 and the SD client device 330 may be lost when the SD client device 330 operates in a LPM/sleep mode. In particular, relatively slow devices (e.g. IOT devices) and low speed embedded devices may exceed the timeout period (T) specified by the SD host 300 for the data write transaction.

In one configuration, the SD client device 330 operates in an LPM/sleep mode when the SD host 300 issues the CMD53 write data request, at time 510. The CMD53 write data request interrupts operation of the SD target device. The SD client device 330, however, is delayed for a time period (t) to come out of the LPM/sleep mode and then sends a response at time 512, after a time period (T+t). It is likely the full cycle for the host transaction will not be completed within the timeout period T specified by the SD host 300. In this example, the host transaction times out because the CMD53 data response from the SD client device 330 is transmitted at time period (T+t).

This synchronization issue is generally due to the host initiated SDIO protocol. In particular, because the SD client device 330 is likely an I/O device, data can pass in either direction, which is problematic because the SDIO protocol limits the SD host from triggering any data transaction commands. As a result, the SD host 300 specifies the length and address of the data to the SD client device 330 prior to the actual data transaction. In addition, the SDIO protocol does not specify a way to report application errors from the SD client device 330 to the SD host 300.

According to one aspect of the present disclosure, a doorbell mechanism is described to maintain synchronization between the SD client device 330 to the SD host 300. According to this aspect of the present disclosure, once device enumeration is complete, the host can initiate a transaction to a connected device of any specified length. Further, a doorbell signal is specified to trigger a data transaction when the target device and the host are active and ready to process a data request sent from host at the application level.

Figure 6:
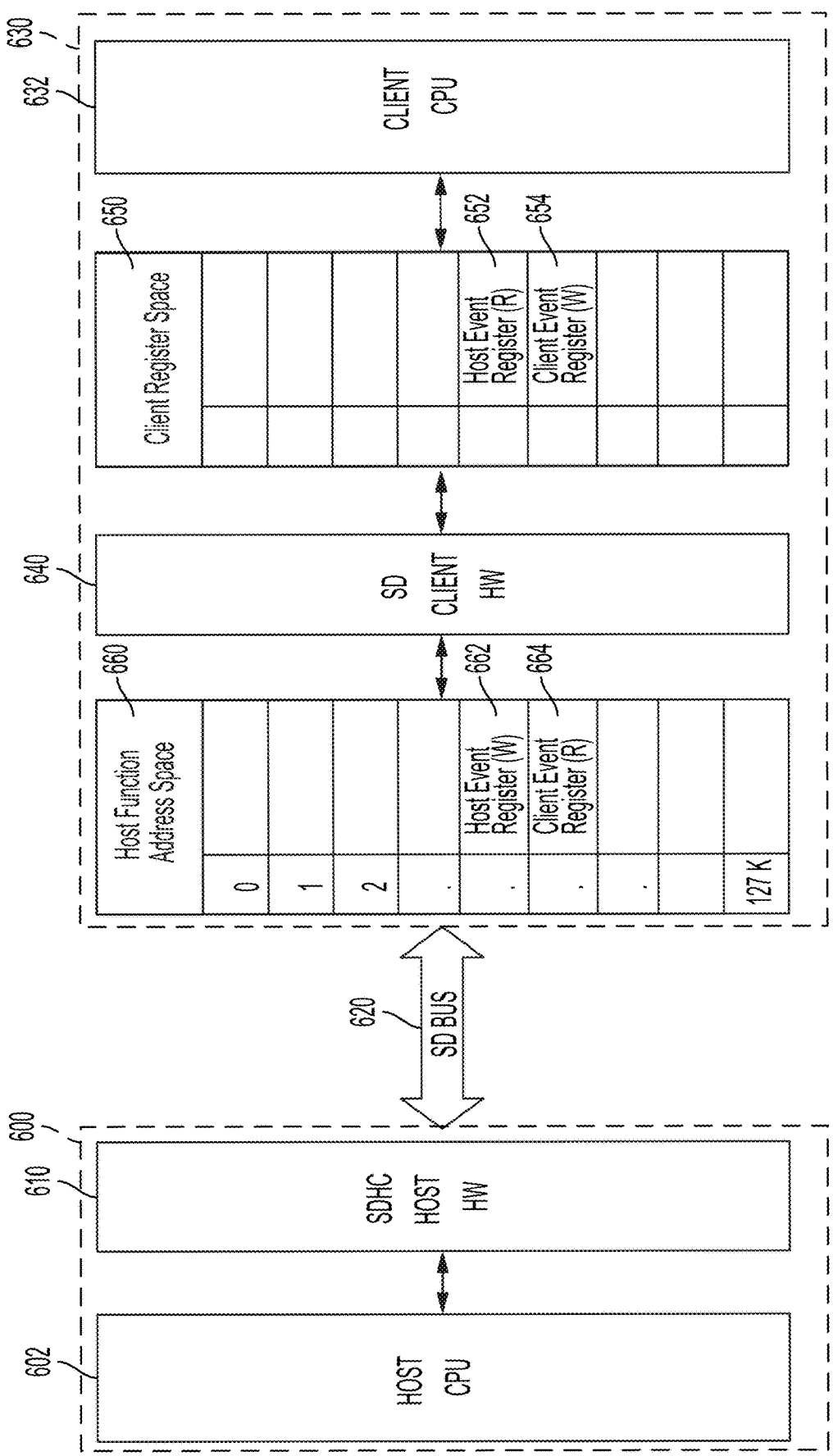
FIG. 6 is a block diagram of hardware further illustrating the host/slave secure digital input/output (SDIO) configuration of FIG. 2, including special event hardware registers in a target device side, according to aspects of the present disclosure.

FIG. 6 is a block diagram of hardware further illustrating the host/slave SDIO configuration of FIG. 2, including special event hardware registers in a target device side, according to aspects of the present disclosure. In this example, an SD host 600 includes a host CPU 602 and an SD host controller (SDHC) host hardware (HW) 610. The SD host 600 is communicably coupled to an SD client device 630 through an SD bus 620. The SD client device 630 includes a client CPU 632 as well as SDIO client hardware (HW) 640. In this aspect of the present disclosure, a host event register (HER) 652 and a client event register (CER) 654 are added to a client register space 650. In addition, a host function address space 660 includes a host event register (HER) 662 and a client event register (CER) 664.

The host event register 662 and the client event register 654 maintain synchronization between the SD host 600 and the SD client device 630 to avoid the transaction timeout scenarios shown in FIGS. 4 and 5. In this configuration, the host event register 662 and the client event register 654 are configured to raise an interrupt to the SD client device 630 or the SD host 600, respectively. For example, if the SD client device 630 wants to interrupt the SD host 600, the SD client device 630 writes to the client event register 654. In response, the SD host 600 sends an SD direct command (e.g., CMD52) to read the client event register 664 in the host function address space 660. Reading of the client event register 664 automatically clears the interrupt. When the SD host 600 wants to interrupt the SD client device 630, the SD host 600 writes to the host event register 662. In this example, the SD client device 630 is responsible for manually clearing the interrupt.

As shown in FIG. 6, the host event register 662 and the client event register 654 are configured to raise an interrupt to the corresponding receiver (e.g., the host event register 652 or the client event register 664) whenever these registers are populated with valid data. The SD host 600 can write to the host event register 662 and read from the client event register 664 using the SD direct command (e.g., CMD52) to the host function address space 660. By contrast, the SD client device 630 directly reads from the host event register 652 and directly writes to the client event register 654 in the client register space 650.

The size of these client event/host event registers can vary from one byte to some maximum value depending on the use case. It should be recognized that design of the client event/host event registers with a minimal size is recommended to achieve maximum advantage. Additionally, the client event/host event registers may be a single register or a first-in-first-out (FIFO) type of register to support pipelining of the data requests, depending on the specifications. Optionally, additional data registers may be specified to carry additional metadata information along with the events.

FIG. 7 is a block diagram illustrating an event register format, according to aspects of the present disclosure. In this example, an event register format 700 is shown using a 32-bit format; however, it should be recognized that other sizes for the event register format 700 are possible. The event register format 700 includes the following fields: (1) Event [0:3]; (2) Mode [4:5]; (3) Count [6:14]; (4) Byte count [15:23]; and (5) Reserved [24:31]. The event field may provide a four-bit event identification (ID), which may have a predetermined meaning.

For example, the four-bit event ID may indicate a transmit event (TX_EVENT), a transmit acknowledgement event (TX_ACK_EVENT), or a receive event (RX_EVENT). The TX_EVENT_ID may indicate the SD host 600 is about to send an SD direct command (e.g., CMD53) for a write operation. By contrast, the RX_EVENT ID may indicate the SD client device 630 is requesting an SD direct command (e.g., CMD53) for a read operation. The TX_ACK_EVENT ID may indicate an acknowledgement from the SD client device 630 of a TX_EVENT_ID, in which the SD client device 630 is requesting the SD direct command for a write operation from the SD host 600.

The two-bit mode field may indicate the following modes: (1) Invalid Mode; (2) Byte Mode; (3) Block Mode; and (4) Block+Byte Mode. The fourth mode (e.g., Block+Byte Mode) may enable combining a block with additional bytes in a single data transaction.

The event register format 700 also includes a nine-bit count field (e.g., Count [6:14]). The nine-bit count field may indicate either a block or a byte count based on the Mode [4:5] field. When contents of the Mode [4:5] field (=11) indicate the Block+Byte mode, the contents of the count field indicate solely the block count.

The event register format 700 further includes a nine-bit byte count field (e.g., Byte count [15:23]). The nine-bit byte count field may indicate a byte count when the contents of the Mode [4:5] field (=11) indicate the Block+Byte mode. A reserved field (e.g., Reserved [24:31]) is a nine-bit field reserved for further expansion.

Figure 8:
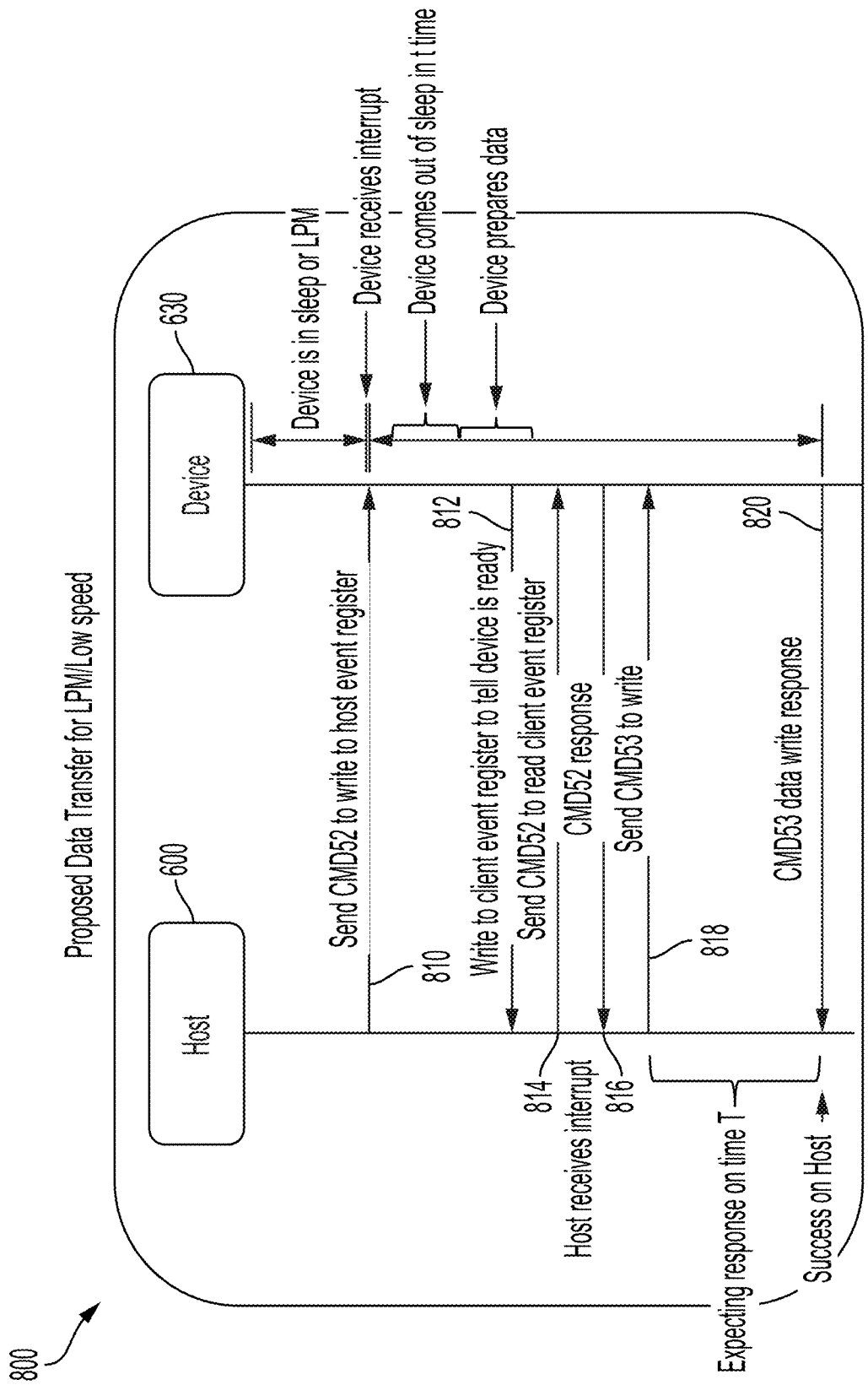
FIG. 8 is a timing diagram further illustrating the host/slave secure digital input/output (SDIO) configuration of FIG. 2 during a successful data transfer process due to communication to/from a target device, in accordance with aspects of the present disclosure.

FIG. 8 is a timing diagram further illustrating the host/slave SDIO configuration of FIG. 2 during a successful data transfer process due to communication to/from a target device, in accordance with aspects of the present disclosure. FIG. 8 illustrates a method 800 of improving device synchronization over a secure digital (SD) bus between the SD host 600 and the SD client device 630.

In the SDIO protocol, the SD client device 630 conventionally cannot communicate a current capability to accept incoming transmit data. According to aspects of the present disclosure, the host event register 662 and the client event register 654 enable communication between the SD client device 630 and the SD host 600. This communication may prevent timeout of data transactions incurred when the SD client device 630 is a low speed embedded (e.g., Internet-of-things (IOT)) device. For example, as shown in FIG. 4, the operating speed of the SD client device 330 may lead to a data preparation timeout. That is, the low speed of the SD client device 330 delays allocation of buffer space within the SD client device 330 to accommodate incoming packet data from the SD host 300.

Referring again to FIG. 8, the SD host 600 compensates for the SD client device 630, which is operating in a low power mode (LPM)/sleep mode. In this aspect of the present disclosure, the SD host 600 compensates for the SD client device 630 by sending an SD direct command to write (e.g., CMD52 write command) the host event register 662 to raise an interrupt to the SD client device 630 at time 810 of the method 800 for improving synchronization. That is, rather than issue an SD extended command (e.g., CMD53) as performed in FIG. 5, the SD host 600 writes to the host event register 662 using the SD direct command (e.g., CMD52) to interrupt the SD client device 630. In this example, the interrupt wakes the SD client device 630, which comes out of sleep mode after a predetermined time period (t).

In response, the SD client device 630 receives the interrupt, and performs a data initialization process. The data initialization process may involve allocation of buffer space of the SD client device 630 to accommodate incoming write data from the SD host 600 (e.g., TX_EVENT_ID=1), as indicated by the host event register 652. In an alternative configuration, the SD client device 630 is not in sleep mode (see FIG. 4) when the interrupt is received. This interrupt notifies the SD client device 630 to initiate the data initialization process to prevent the timeout of the transaction, as shown in FIG. 4. In this low speed configuration, the interrupt from the SD host 600 compensates for a low speed of the SD client device 630 by providing a head start with the data initialization process.

Once this data initialization process is complete, at time 812, the SD client device 630 raises an interrupt to the SD host 600 by writing to the client event register 654. This host interrupt informs the SD host 600 that the SD client device 630 is ready to receive write data. At time 814, the SD host 600 sends the SD direct command (e.g., CMD52) to read the client event register 664, which clears the host interrupt to the SD host 600. At time 816, the SD direct command response is received. At time 818, the SD host 600 sends the SD extended command (e.g., CMD53) to write data to the SD client device 630. This process is completed at time 820, when an SD extended command response (e.g., CMD53) is received by the SD host 600 as notification of a successful data write transaction.

According to aspects of the present disclosure, the SD client device 630 is ready before the SD host 600 sends an SD extended command (e.g., CMD53 write request). As a result, this data write transaction will not time out due to a low speed target device or a sleep/low power mode of the SD client device 630. In this aspect of the present disclosure, the addition of the host event register 652 and the client event register 654 to the client register space 650 enables the SD client device 630 to interrupt the SD host 600 for the SD extended command (e.g., the CMD53 write request).

As shown in FIG. 6, adding the host event register 662 and the client event register 664 to the host function address space 660 of the SD host 600 enables communication between the SD host 600 and the SD client device 630 before an SD extended command (e.g., CMD53 read/write request). The host event register 662 and the client event register 654 may also prevent timeout of low speed embedded (e.g., Internet-of-things (IOT)) devices (see FIG. 4). In particular, the SD host 600 writes to the host event register 662 to wake up the target when operating in a low power mode (LPM), as shown in FIG. 8.

Figure 9A:
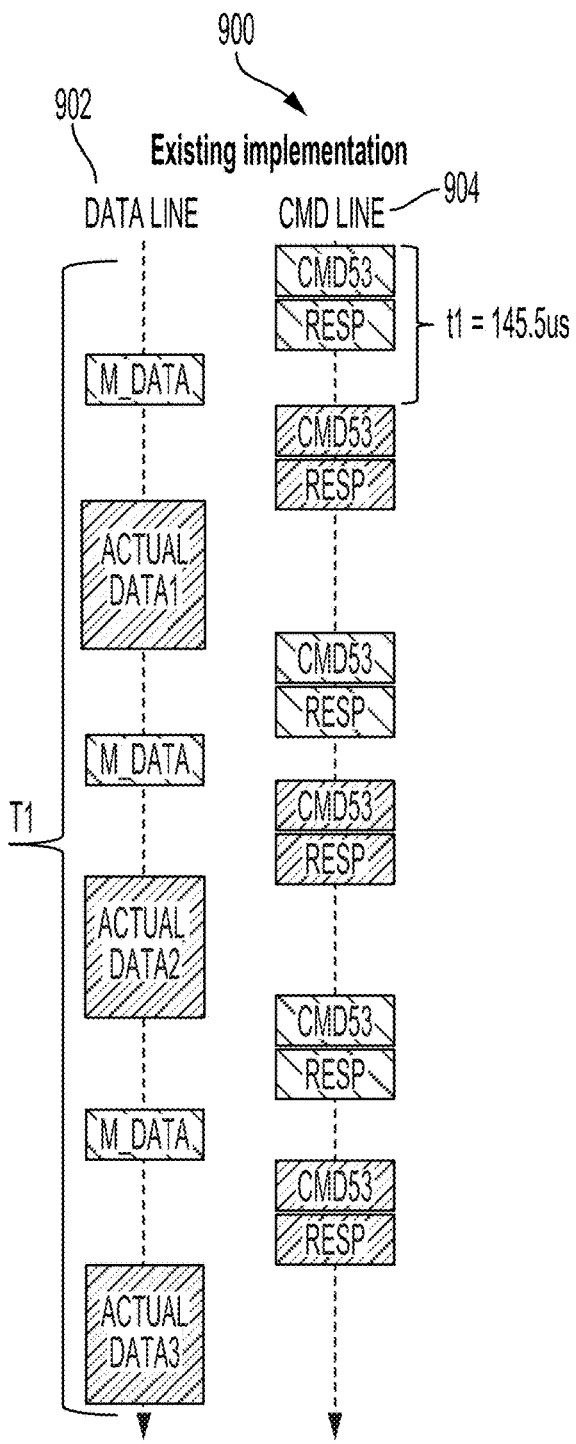
FIGS. 9A and 9B are block diagrams illustrating pipelined processing of read/write requests between host and target devices according to aspects of the present disclosure.
Figure 9B:
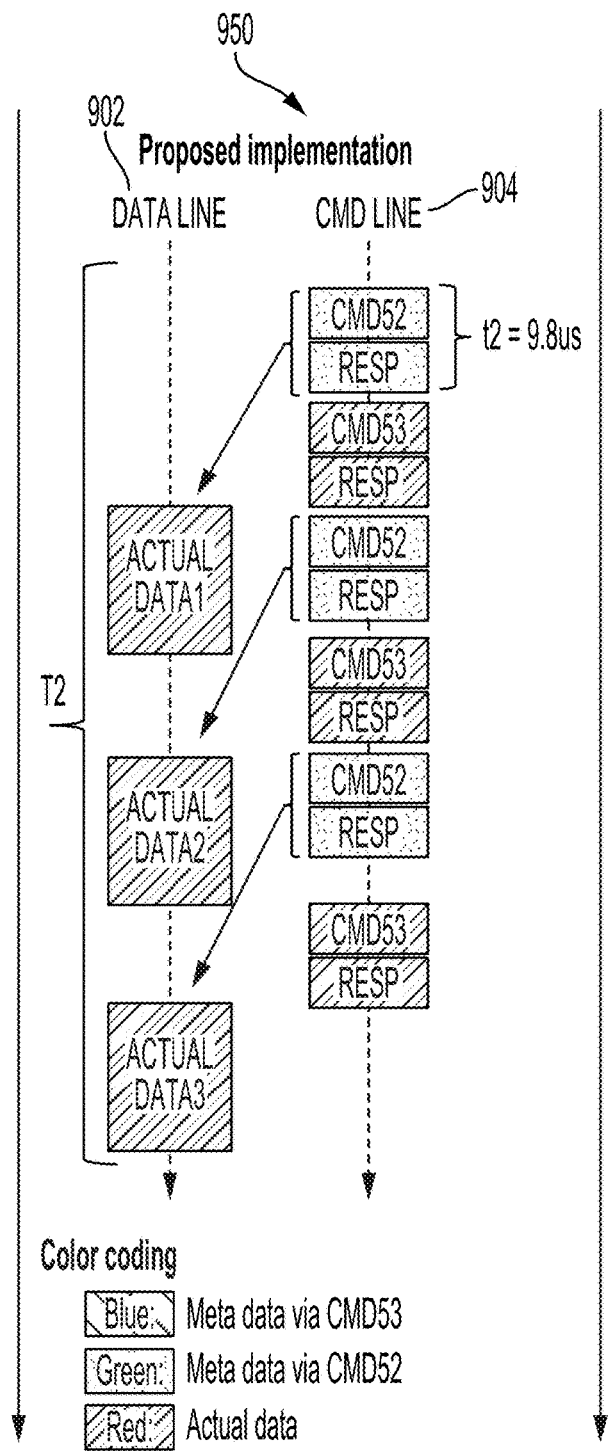

FIGS. 9A and 9B are block diagrams illustrating pipelined processing of read/write requests between host and target devices, according to aspects of the present disclosure. FIG. 9A is a block diagram illustrating an existing implementation 900 in which an SD host has multiple data streams for an SD client device, performed in a predetermined first amount of time T1. For example, during a read/write cycle, the SD host sends an SD extended command (e.g., CMD53) for the read/write request. The CMD53 command is sent through a command (CMD) line (e.g., CMD LINE 904) and the SD client device sends a CMD53 response (RESP) on the CMD LINE 904. The RESP is followed by metadata (M_DATA) on a DATA LINE 902, which performed in a predetermined time, referred to as a metadata exchange delay (t1). After decoding the M_DATA, the SD host sends a CMD53 command to read/write data on the CMD LINE 904 and receives a CMD read/write response (RESP) on the CMD LINE 904. The ACTUAL DATA1 is subsequently received on the DATA LINE 902.

FIG. 9B is a block diagram illustrating a proposed implementation 950 to efficiently support multiple data streams between an SD host and an SD client device. The pipelined processing of read/write requests between host and target devices in FIG. 9B is performed in a predetermined amount of a second time T2, which is less than the first T1 (e.g., T2=T1−2(t1)). The SDIO protocol provides the CMD52 command (e.g., SD direct command) to transact one byte between the SD host 600 and the SD client device 630 using only the command (CMD) pin of the SD bus (see FIG. 2). Notably, the SDIO protocol conventionally prohibits the CMD52 command from being simultaneously active (e.g., performed in parallel) with the CMD53 command on the SD bus. In particular, standard SD host drivers (e.g., Linux standard SD host drivers) block other commands from being active on the SD bus 220 while the CMD53 command is active on the SD bus 220. Generally, only an abort command is unblocked during an active CMD53 command. This abort command may be sent simultaneously with the CMD53 command for special handling.

According to aspects of the present disclosure, an SD host driver is modified to enable activation of a CMD52 command simultaneously with an active CMD53 command on an SD bus, as desired. This simultaneous activation of the CMD52 and CMD53 commands on the SD bus 620 conforms with the SD specification of the SDIO protocol. In this aspect of the present disclosure, the SD host driver of the SD host 600 is provided with two independent channels for communicating with the SD client device 630. As described, a meta-channel may refer to a CMD52 channel, and a data-channel may refer to a CMD53 channel.

In operation, because a CMD52 may be transmitted over the CMD LINE 904 while the DATA LINE 902 is busy transferring data, the SD host can send a CMD52 to the SD client device to prepare a next data transaction during a current data transaction. The SD client device prepares a buffer and informs the SD host to transfer/receive data when the current data transaction is complete. The proposed implementation 950 significantly improves performance. In this example, three packets of data (e.g., ACTUAL DATA1, ACTUAL DATA2, and ACTUAL DATA3) are exchanged over the DATA LINE 902. The existing implementation 900 incurs a metadata exchange delay (e.g. t1=145.5 microseconds (us)) for each data packet (e.g., T1=3×145.5 us=436.5 us).

As shown in FIG. 9B, the proposed implementation 950 incurs a metadata exchange delay (e.g., t2=9.8 us) for the first data packet (e.g., ACTUAL DATA1), which is less than the metadata exchange delay (e.g., t1>t2) of the existing implementation 900. The metadata exchange delay of the proposed implementation 950 is limited to the first data packet because the subsequent CMD52 and RESP are performed in parallel with the previous data transaction. That is, metadata exchanged using CMD52 for a next transaction can run in parallel to the previous data transaction (e.g., ACTUAL DATA1) for a continuous chunk of pipelined data traffic. In this scenario, approximately 426.7 microseconds are saved for the three-packet example shown, which would increase exponentially for an N packet pipeline of data traffic.

As noted, in existing solutions, the SD host initiates data transactions, however, there is no mechanism in which the SD client device can interrupt the SD host. Therefore, during conventional operation, the SD host frequently polls the SD client device to check whether any data is available. This polling leads to frequent waking of the SD client device (e.g., during low power mode (LPM)/sleep mode). In addition, the SD host continues to run as it waits for the SD client device to wake and provide a response. That is, when the SD client device is in the LPM/sleep mode, the SD client device first recovers from the LPM/sleep mode and then responds to the SD host, which wastes power when no data is available.

Figure 10:
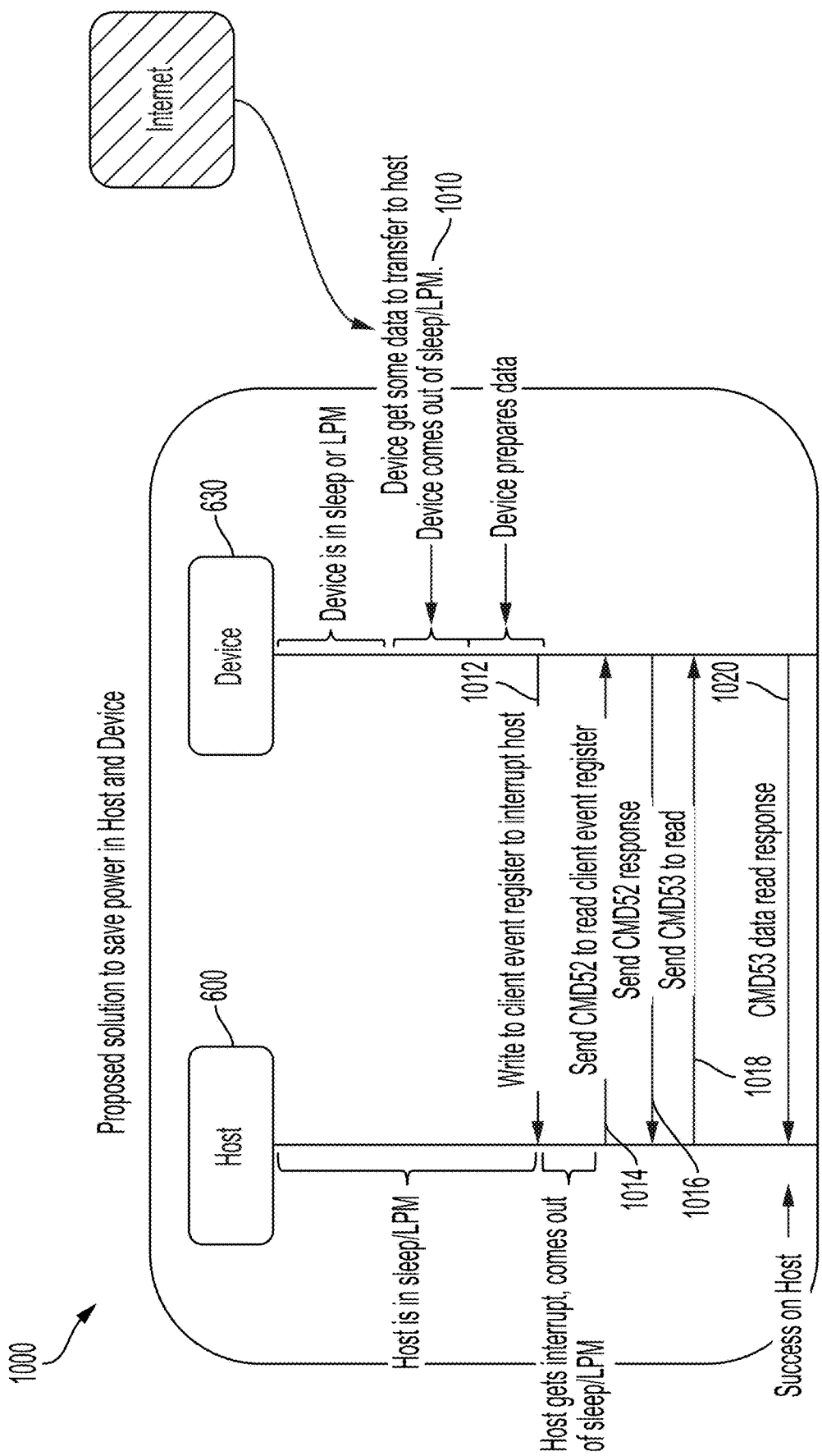
FIG. 10 is a timing diagram further illustrating the host/slave secure digital input/output (SDIO) configuration of FIG. 2 for a data transfer process during low power mode (LPM)/sleep mode of both a host device and/or a target device, in accordance with aspects of the present disclosure.

FIG. 10 is a timing diagram further illustrating the host/slave SDIO configuration of FIG. 2 for a data transfer process 1000 during LPM/sleep mode of both a host device and/or a target device, in accordance with aspects of the present disclosure. In this example, both the SD host 600 and the SD client device 630 are in LPM/sleep mode when the SD client device 630 receives data for the SD host 600 at time 1010 (e.g., from the Internet). In this aspect of the present disclosure, the SD client device 630 prepares the data and informs the SD host 600 at time 1012 using a client event register (CER) to interrupt the SD host 600 to wake from LPM/sleep mode.

In this example, the SD client device 630 informs the SD host 600 that the SD client device 630 has data for the SD host 600 by writing to the client event register 654. In response, the SD host 600 sends an SD direct command (e.g., CMD52) to read the client event register 664 from the host function address space 660 and interpret the contents of the client event register 664, at time 1014. A response to the SD direct command (e.g., CMD52) is received at time 1016. At time 1018, the SD host 600 sends an SD extended command (e.g., CMD53) to read the data from the SD client device 630. A response to the SD extended command (e.g., CMD53) is received at time 1020 to complete the process.

The data transfer process 1000 enables both the SD client device 630 and the SD host 600 to operate in an LPM/sleep mode for an increased amount of time by avoiding polling of the SD client device 630. This data transfer process 1000, therefore, saves power for both the SD client device 630 and the SD host 600. For example, in conventional operation, the SD host 600 awakens for 50 ms each second to check if the SD client device 630 has any available data to send the SD host 600. This process may consume a total of 20.53 mA per second. By contrast, the data transfer process 1000 avoids polling, thereby limiting energy consumption to 5.59 mA per second. This results in approximately a 74% energy savings when data is unavailable.

According to aspects of the present disclosure, preventing timeout of low speed embedded devices as well as LPM/sleep mode devices may improve boot-loader hardware to expedite device boot-up. For example, data transactions cannot start until both the SD host 600 and SD client device 630 have completed their enumeration sequence as part of a device boot-up process. Unfortunately, there is no mechanism to notify the SD client device 630 whether the SD host 600 enumeration process is complete. In this target driven enumeration process, an application layer may hardcode a wait time for the SD client device 630. The hardcoded enumeration wait time, however, is undesirable. First, even if the SD host 600 is fast enough to complete the enumeration sequence quickly, the read/write data transaction cannot begin until the hardcoded wait time completes. Hence, the boot-up is impacted by the hardcoded wait time. Second, if the SD host 600 cannot complete the enumeration sequence within the hardcoded wait time, the SD client device 630 may error out due to an assumed problem on the host side.

Figure 11:
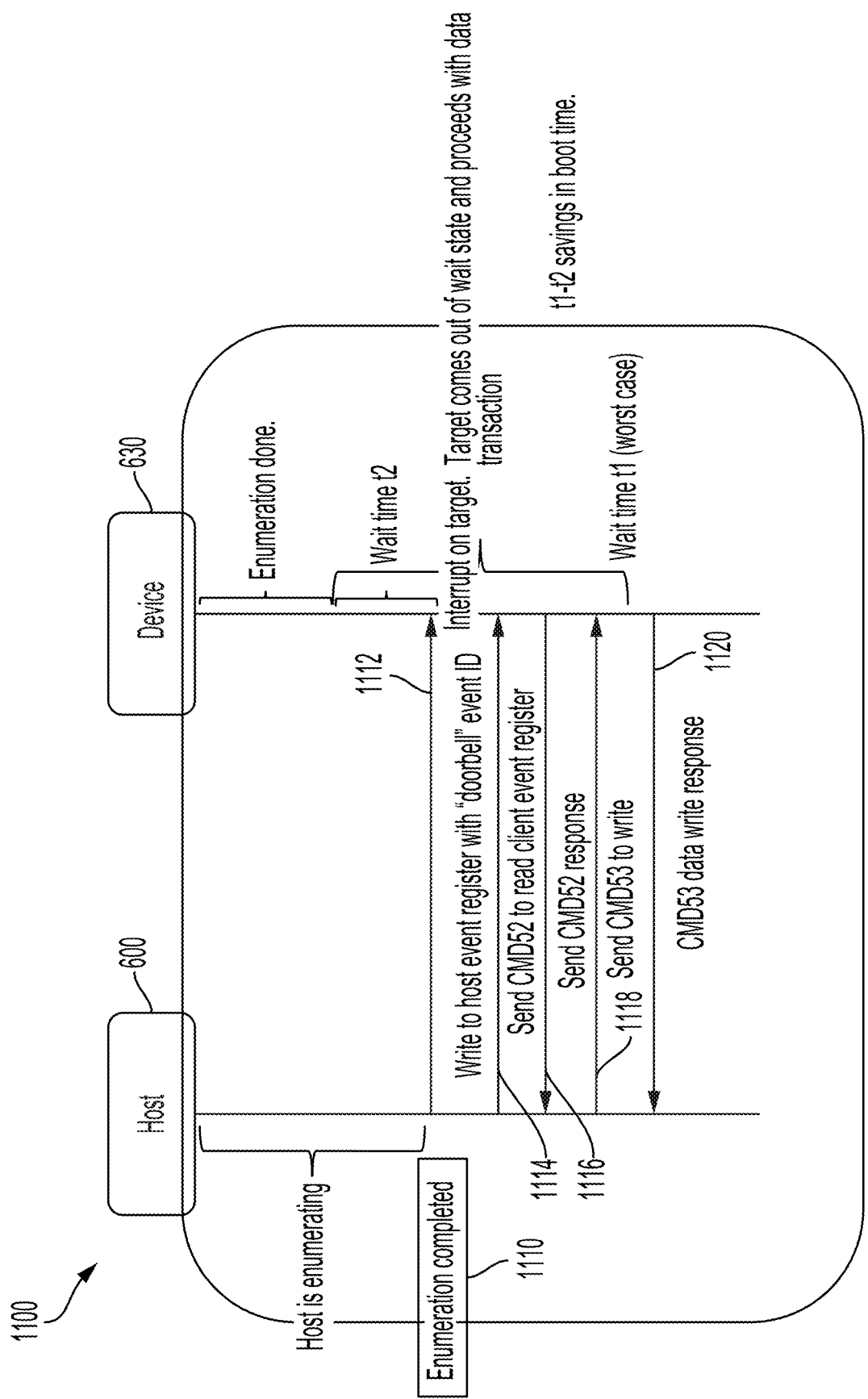
FIG. 11 is a timing diagram further illustrating the host/slave secure digital input/output (SDIO) configuration of FIG. 2 for a device enumeration process, in accordance with aspects of the present disclosure.

FIG. 11 is a timing diagram further illustrating the host/slave SDIO configuration of FIG. 2 for a device enumeration process 1100, in accordance with aspects of the present disclosure. In this example, an enumeration process time of the SD host 600 exceeds the enumeration process time of the SD client device 630. At time 1110, the enumeration process of the SD host 600 is complete. Once completed, the SD host 600 writes to the host event register 662 at time 1112. In this aspect of the present disclosure, the SD host 600 writes an event identification to the host event register 662, raising an interrupt to the SD client device 630. In response to the interrupt, the SD client device 630 transitions from a wait state to an active state for proceeding with read/write transactions.

In this proposed solution, the SD host 600 notifies the SD client device 630 that it has completed its enumerations sequence and is now ready to commence data transactions. This notification to the SD client device 630 is performed by writing to the host event register 662. This interrupt terminates a wait time (t2) for completion of an enumeration sequence of the SD client device 630, which is less than a worst case (e.g., hardcoded) wait time (t1). In the device enumeration process 1100, the SD host 600 populates the host event register 662 with a doorbell event identification (ID). The SD client device 630 receives the interrupt, reads the host event register 652 from the client register space 650, and decodes the event ID. Once the doorbell event ID is detected by the SD client device 630, both the SD client device 630 and the SD host 600 are free to initiate a read/write data transaction. In this example, a CMD53 write request is issued by the SD host 600 at time 1118, after sending the CMD52 command to read the client event register 664 at time 1114, and sending the CMD52 response at time 1116. A CMD53 data write response is finally sent at time 1120.

Figure 12:
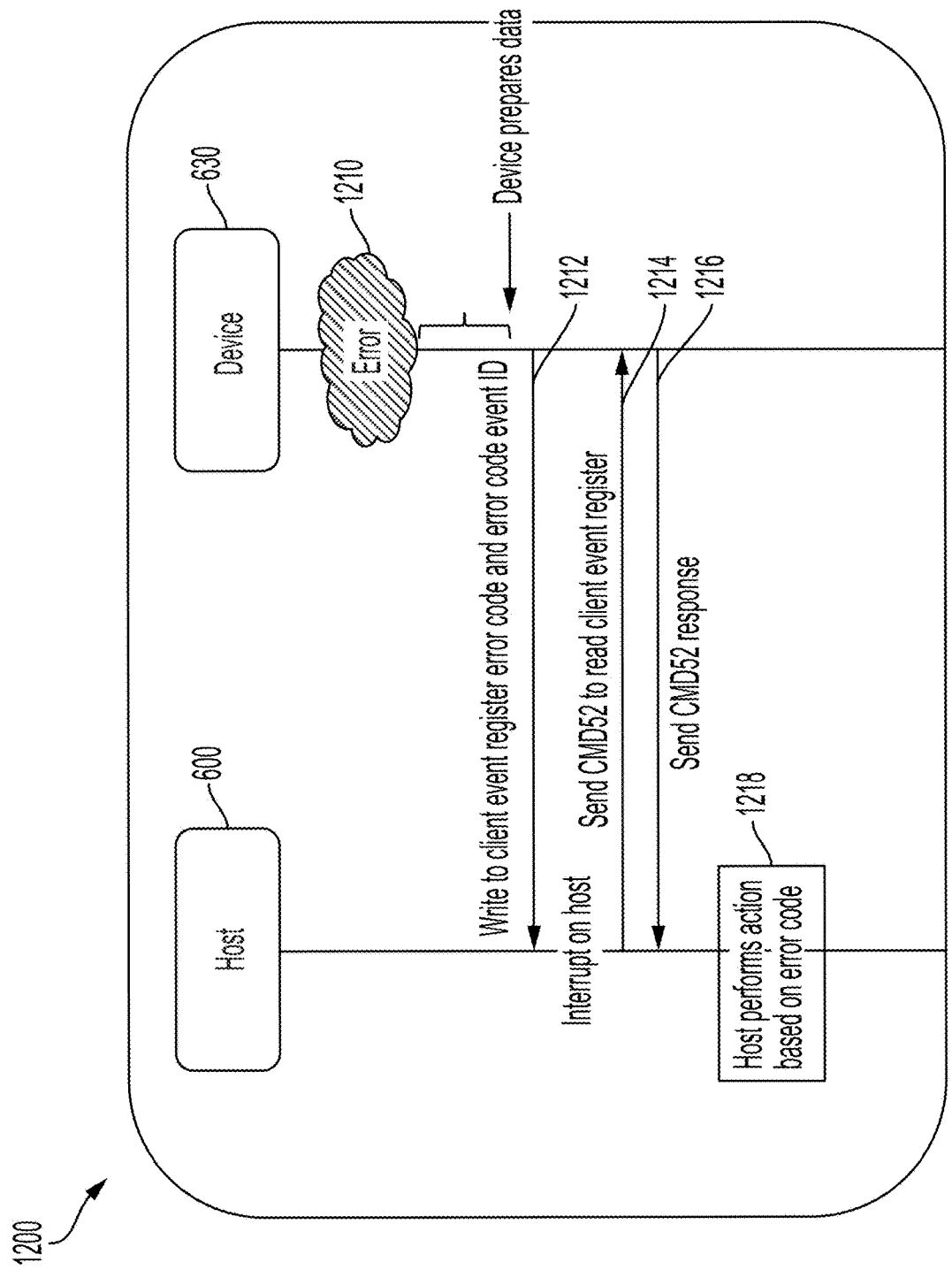
FIG. 12 is a timing diagram further illustrating the host/slave secure digital input/output (SDIO) configuration of FIG. 2 for a target device error process, in accordance with aspects of the present disclosure.

FIG. 12 is a timing diagram further illustrating the host/slave SDIO configuration of FIG. 2 for a target device error process 1200, in accordance with aspects of the present disclosure. In this example, an error scenario at a target side (e.g., could be due to data loss, CRC (cyclic redundancy check) error or SW (software) error) of the SD client device 630 is shown. In this scenario, an application running on a host side performs an error recovery process. For example, the error recovery process may involve a shutdown or performing actions for specific errors. In this aspect of the present disclosure, the client event register 654 provides a mechanism to notify the SD host 600 about the error at time 1210. At time 1212, the SD client device 630 writes to the client event register 654, including a detected error code as well as an error code event ID. At time 1214, the SD host 600 sends a CMD52 read command to read the client event register 664, with a CMD52 read response received at time 1216. At block 1218, the SD host 600 performs a predetermined action based on the error code read from the client event register 664.

Figure 13:
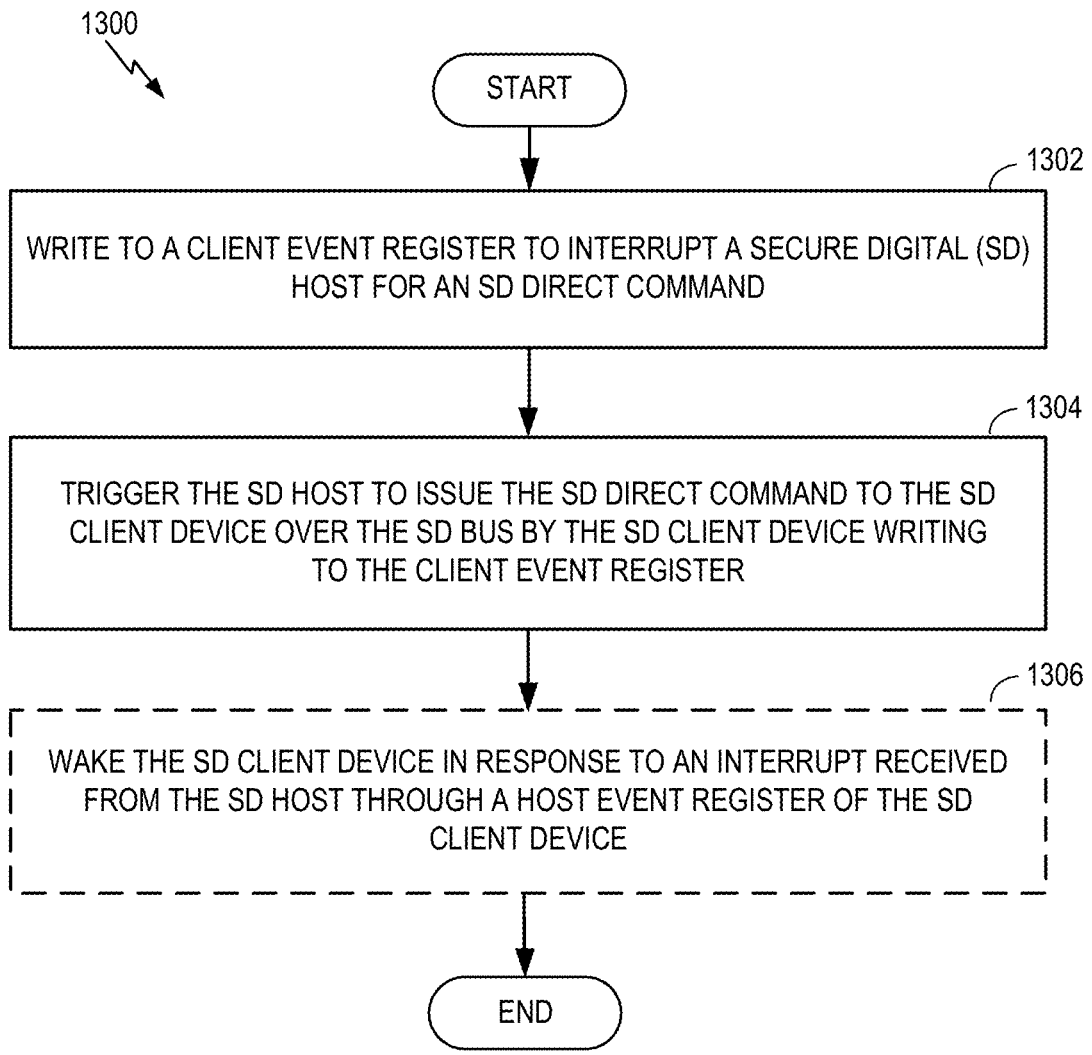
FIG. 13 is a flow diagram illustrating a method improving device synchronization over a secure digital (SD) bus between an SD host and an SD client device, according to aspects of the present disclosure.

FIG. 13 is a flow diagram illustrating a method 1300 of improving synchronization over a secure digital (SD) bus between an SD host and an SD client device, according to aspects of the present disclosure. At block 1302, a client event register is written to interrupt the SD host for an SD extended command. For example, as illustrated in FIG. 10, the SD client device 630 writes to the client event register 654 at time 1012. The SD client device 630, which cannot issue SD commands (e.g., CMD52 and CMD53), has write access to the client event register 654 and read access to the host event register 652 because these registers are newly added to the client register space 650 shown in FIG. 6.

At block 1304, the SD host is triggered to issue the SD direct command to the SD client device over the SD bus by the SD client device writing to the client event register. For example, as shown in FIG. 10, the SD host 600 issues the CMD53 command to read data from the SD client device 630 at time 1018. As shown in FIG. 8, the SD host 600 is triggered to send the CMD53 command to write data to the SD client device 630 at time 818 by the SD client device 630 writing to the client event register 654 at time 812.

Referring again to FIG. 13, at optional block 1306, the SD client device awakens in response to an interrupt received from the SD host through a host event register of the SD client device. For example, as shown in FIG. 8, the SD host 600 wakes the SD client device 630 from an LPM/sleep mode by sending a CMD52 command to write the host event register 662 to raise an interrupt to the SD client device 630 at time 810. This example compensates for the LPM/sleep mode of the SD client device 630 delaying a CMD53 write command until the SD host 600 first writes to the host event register 662 to interrupt and wake the SD client device 630. In this example, the interrupt wakes the SD client device 630, which prevents timeout of the data transaction of FIG. 5.

One aspect of the present disclosure describes an apparatus for improving synchronization over a secure digital (SD) bus between an SD host and an SD client device including means for writing to a client event register to interrupt the SD host for an SD extended command. The apparatus also includes means for triggering the SD host to issue the SD extended command to the SD client device over the SD bus in response to the SD client device writing to the client event register. The trigger means may be the CPU 102, the GPU 104, the DSP 106, the NPU 108, and/or the memory 118 of a client/slave device 230. In another aspect, the aforementioned means may be any module or apparatus configured to perform the functions recited by the aforementioned means.

For a firmware and/or software implementation, the methodologies may be implemented with modules (e.g., procedures, functions, and so on) that perform the described functions. Any machine-readable medium tangibly embodying instructions may be used in implementing the methodologies described. For example, software codes may be stored in a memory and executed by a processor unit. Memory may be implemented within the processor unit or external to the processor unit. As used the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communications media including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD) and Blu-ray disc, where disks usually reproduce data magnetically, while discs reproduce data optically with lasers. Combinations of the above should also be included within the scope of computer-readable media.

The previous description is provided to enable any person skilled in the art to practice the various aspects described. Various modifications to these aspects will be readily apparent to those skilled in the art, and the generic principles defined may be applied to other aspects. Thus, the claims are not intended to be limited to the aspects shown, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated by reference and are intended to be encompassed by the claims. Moreover, nothing disclosed is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A method of improving synchronization over a secure digital (SD) bus between an SD host and an SD client device, the method comprising:
   writing, by the SD client device, to a client event register to interrupt the SD host for an SD extended command; and
   triggering the SD host to issue the SD extended command to the SD client device over the SD bus in response to the SD client device writing to the client event register.

2. The method of claim 1, further comprising:
   initiating, by the SD client device, a data initialization process in response to an interrupt from the SD host through a host event register of the SD client device; and
   writing to the client event register to trigger the SD host to issue the SD extended command when the data initialization process is complete.

3. The method of claim 2, further comprising:
   reading write data packets over data lines of the SD bus from the SD host; and
   storing the write data packets in a client buffer allocated according to the data initialization process.

4. The method of claim 1, further comprising waking the SD client device in response to an interrupt received from the SD host through a host event register of the SD client device.

5. The method of claim 1, in which the SD extended command comprises a CMD53 read command or a CMD53 write command.

6. The method of claim 1, further comprising writing to the client event register to raise an interrupt from the SD client device to notify the SD host regarding data available from the SD client device.

7. The method of claim 1, further comprising:
   receiving write metadata over a command (CMD) line of the SD bus, from the SD host to the SD client device, to notify the SD client device of a next data transaction available from the SD host; and
   performing a data initialization process for the next data transaction during a current data transaction.

8. The method of claim 1, further comprising:
   receiving an interrupt from the SD host at the client event register of the SD client device; and
   terminating an enumeration delay period in response to the interrupt from the SD host.

9. The method of claim 1, further comprising writing an error event identification (ID) and an error code to the client event register.

10. The method of claim 1, further comprising writing a doorbell event identification (ID) in the client event register to wake the SD host in order to notify the SD host regarding data available from the SD client device.

11. A method of improving synchronization over a secure digital (SD) bus between an SD host and an SD client device, the method comprising:

writing to a host event register of a host function address space to notify the SD client device of an SD extended command using an SD direct command; and issuing, by the SD host, the SD extended command to the SD client device in response to an interrupt from the SD client device through a client event register of the host function address space.

12. The method of claim 11, in which writing to the host event register comprises:

initiating, by the SD host, a data initialization process by triggering an interrupt to the SD client device by writing to the host event register of the host function address space;

detecting the data initialization process is complete in response to the interrupt from the host event register of the host function address space; and then initiating the SD extended command to the SD client device.

13. The method of claim 11, further comprising:

transmitting write data packets over data lines of the SD bus from the SD host to the SD client device; and storing, by the SD client device, the write data packets in a client buffer allocated according to a data initialization process.

14. The method of claim 11, in which the SD extended command comprises a CMD53 read command or a CMD53 write command, and the SD direct command comprises a CMD52 read command or a CMD52 write command.

15. A secure digital (SD) client device configured to improve synchronization over an SD bus, the SD client device comprising:

a client event register; and a processor coupled to the client event register, the processor configured:

to write to the client event register to interrupt an SD host for an SD extended command; and to trigger the SD host to issue the SD extended command to the SD client device over the SD bus by writing to the client event register.

16. The SD client device of claim 15, in which the processor is further configured:

to initiate a data initialization process in response to an interrupt from the SD host through a host event register of the SD client device; and to write to the client event register when the data initialization process is complete to trigger the SD host to issue the SD extended command.

17. The SD client device of claim 15, in which the processor is further configured to wake the SD client device in response to an interrupt received from the SD host through a host event register of the SD client device.

18. The SD client device of claim 15, in which the SD extended command comprises a CMD53 read command or a CMD53 write command.

19. The SD client device of claim 15, in which the processor is further configured:

to receive an interrupt from the SD host at the client event register of the SD client device; and to terminate an enumeration delay period in response to the interrupt from the SD host.

20. The SD client device of claim 15, in which the processor is further configured to write a doorbell event identification (ID) in the client event register to wake the SD host in order to notify the SD host regarding data available from the SD client device.

* * * * *